United States Patent [19]

Owades et al.

[11] Patent Number: 4,837,034

[45] Date of Patent: Jun. 6, 1989

[54] PREPARATION OF LOW CALORIE BEER

[75] Inventors: Joseph L. Owades, San Francisco, Calif.; Charles J. Koch, Cambridge, Mass.

[73] Assignee: Boston Beer Limited Partnership, Boston, Mass.

[21] Appl. No.: 81,878

[22] Filed: Aug. 4, 1987

[51] Int. Cl.$^4$ .......................... C12C 9/00; C12C 11/04
[52] U.S. Cl. ........................................ 426/16; 426/29; 426/64; 426/592
[58] Field of Search ....................... 426/11, 13, 15, 14, 426/16, 18, 28, 29, 61–62, 64, 590, 592, 600

[56] References Cited

U.S. PATENT DOCUMENTS

| | | | |
|---|---|---|---|
| 4,041,180 | 8/1977 | Wilson | 426/16 |
| 4,622,224 | 11/1986 | Owades | 426/18 |
| 4,652,451 | 3/1987 | Leedham et al. | 426/16 |

OTHER PUBLICATIONS

Kirsop, "Pitching Rate", Jul. 1978, Brewer's Digest, pp. 20–22.

Meilgaard et al., "Beer Flavor Terminology", 1979, American Society of Brewing Chemists, pp. 47–52.

*Primary Examiner*—Marianne Cintins
*Attorney, Agent, or Firm*—Hayes, Soloway, Hennessey & Hage

[57] ABSTRACT

A low-calorie, all-malt beer characterized by full body and flavor of a conventional all-malt beer and a method of preparing the same without any external enzymes is described. A wort is prepared by blending warm malt mash with hot water under conditions which avoid exposing the blend of hot water and the malt mash to temperature between about 52° C. and 75° C., and the resultant wort is converted to beer by fermenting the wort with Brewer's yeast. The wort extract is oxygenated with substantially pure oxygen in place of air normally used in the fermentation, and the Brewer's yeast is added to the wort extract at a rate of about 30 to 60 grams pressed yeast per 100 liters wort so as to absorb, within the yeast cells of the Brewer's yeast, substantially all harsh and grainy flavor compounds contained in the wort extract.

6 Claims, No Drawings

PREPARATION OF LOW CALORIE BEER

FIELD OF INVENTION

The present invention relates generally to a method for preparing a beer. More particularly, the invention relates to a method for preparing a low calorie, flavorful, all-malt beer.

DESCRIPTION OF THE PRIOR ART

In the production of beer, yeast is used to ferment into ethyl alcohol a substrate made of a mixture of fermentable and unfermentable carbohydrates. The wort carbohydrates involved which can be fermented by Brewer's yeast are normally maltose, glucose, maltotriose, sucrose and fructose. The wort carbohydrates are obtained by allowing malt enzymes (alpha and beta amylase) to transform starch molecules from malt and possibly other cereals into the sugars outlined above. This is done during the so-called mashing operation.

Conventional mashing involves mixing togther of malt with or without cereal adjuncts in hot water, followed by a series of heating and resting cycles. Substances which are solubilized in the hot water are collectively called the extract. Following mashing, the soluble materials are separated during lautering, leaving behind the spent grains. The clear liquid (wort) obtained by the extraction may then be transferred to a brew kettle and boiled for a period of time to inactivate the malt enzymes, among other things.

Hops are added during kettle boil after which the wort is cooled, aerated, pitched with yeast and allowed to ferment. Wort compositions vary depending on the bill of materials, mash cycle employed, etc. However, a typical wort is made up of approximately 65 to 80% fermentable carbohydrates of the type mentioned before and about 20 to 35% nonfermentable carbohydrates. After fermentation a beverage is obtained which usually contains from 3 to 5% alcohol with approximately equal amounts of residual dextrin forming the bulk of dissolved solids, commonly referred to as real extract. This residue remains because of the inability of malt amylases to hydrolyze the alpha 1,6 linkages of the starch.

In the production of low calorie beers, an attempt is made to obtain a higher proportion of alcohol and a much lower amount of residual dextrin. This results in a beer which has a lower specific gravity at end fermentation than normally obtained. The first superattenuated products made were produced by a process which consisted of adding an external enzyme in the fermenter. (See Gablinger U.S. Pat. No. 3,379,534). That particular enzyme, a glucoamylase, has the capability of hydrolyzing both alpha 1,4 and alpha 1,6 linkages of the starch and is usually obtained from the mold Aspergillus niger. The use of glucoamylase is not considered desirable by some brewers because the enzyme may be considered to be exogenous to the brewing process. That is, it is not present nor is it isolated from traditional brewing materials, e.g. malt, rice, corn or yeast.

It is thus a primary object of the present invention to provide a new and improved process for producing low-calorie beer which overcomes the aforesaid and other disadvantages of the prior art. Another object of the present invention is to provide a novel and improved process for producing an all-malt beer containing a reduced level of calories. Still objects of the present invention are to provide a method for producing an all-malt beer of reduced calorie content, but characterized by the full body and flavor of a conventional all-malt beer, and devoid of grainy character. A specific object of the invention is to provide a novel and improved method for producing an all-malt beer having a relatively low calorie count, using existing equipment and materials, without the addition of external enzymes. Still other objects of the invention will in part be obvious and will in part be apparent hereinafter.

BRIEF DESCRIPTION OF THE INVENTION

These and other objects of the present invention are achieved by processing a warm malt mash under conditions which avoid exposing the malt mash to temperatures between about 52° C. and about 75° C., i.e. in accordance with the teachings of U.S. Pat. No. 4,622,224 to Joseph L. Owades, whereby to produce a wort which is characterized by a reduced level of simple, fermentable sugars. The wort resulting from the process described in U.S. Pat. No. 4,622,224 is then cooled to a conventional fermentation temperature and the cooled wort is oxygenated with substantially pure oxygen and pitched with a conventional Brewer's yeast at a rate at which the yeast growth is capable of absorbing substantially all the material capable of producing harsh, grainy flavors. The pitched wort is then fermented in a conventional manner, and the resulting fermented product is then aged, filtered, carbonated, bottled and pasteurized all in conventional manner. The resulting product is a low-calorie, all-malt beer characterized by a typical beer flavor and body.

The invention accordingly comprises the processes involving the several steps and relation of one or more such steps with respect to each other, and the materials and products possessing the features, properties and relations of elements, all of which are exemplified in the detailed description, and the scope of the application, which will be indicated in the claims.

DETAILED DESCRIPTION OF THE INVENTION

Generally, the first step of the process of the present invention comprises batch preparation of ground malt mash with or without a boiled cereal adjunct in accordance with the teachings of U.S. Pat. No. 4,622,224. The ground mash is prepared by mixing a measured quantity of malt with warm water, e.g. in a mash tub. Typically, the water is maintained at a temperature in the range of 40° C. to 50° C. and not much higher than about 52° C. After addition of all the malt the mash is then maintained at this temperature for a period of an hour or less.

Concurrent with the formation of the malt mash in the mash tub, a measured quantity of corn grits or rice may be mixed in water and heated to boiling in a cereal cooker. A small amount of malt is added to the cooker. The contents of the mash tub are then added to the boiling liquid in the cooker. The malt mash first added to the boiling liquid substantially instantly is raised to a temperature of about 100° C., with the successive quantities of the malt mash being heated to successively lower temperatures. The relative quantities of liquids in the cooker and mash tub are chosen so that the final temperature, i.e. upon completion of the addition of the entire malt mash to the cooker, is at least about 75° C. At this temperature the sugar-producing beta-amylase present is sufficiently active to break down the starches to soluble dextrins and thus provide the desired extract. This will be true as long as the temperature during the addition is maintained above 75° C.

The mash is then filtered in a lauter tub, mash filter or other means, and resulting wort boiled with hops, filtered and cooled.

The resulting wort is cooled to a conventional fermentation temperature, typically in the range of about 8° to 18° C., preferably about 10° to 14° C., transferred to a fermenter and converted directly into beer. Fermentation proceeds using a conventional Brewer's yeast, e.g. *Saccharomyces cerevisiae* or *Saccharomyces carlsbergensis*. However, unlike a conventional beer fermentation process, the cooled wort is oxygenated using substantially pure oxygen, and the Brewer's yeast is added at a relatively low pitching rate, typically, and preferably in the range of about 30 to 60 grams pressed yeast per 100 liters wort, and preferably about 45 grams pressed yeast per 100 liters wort. The normal pitching rate is about 170 grams pressed (wet) yeast per 100 liters of wort. This is a departure from prior art brewing techniques and is unexpected since prior art attempts to produce beer at relatively low pitching rates using conventional worts and normal aeration reportedly do not produce satisfactory fermentation results. (See B. H. Kirsop, *The Brewer's Digest*, July 1978, page 28 to 32). Adding the brewer's yeast at such a low pitching rate to oxygenated wort permits the yeast to absorb substantially all harsh and grainy flavors normally present in the wort.

Fermentation is then continued for 5 to 10 days at 10° to 16° C. Following fermentation, the resulting beer is aged, filtered, bottled and pasteurized all in conventional manner. The resulting beer is characterized by a lower than normal calorie count (typically 99 calories in twelve ounces) but having the typical full flavor and body of all malt beer.

WORKING EXAMPLES

The following examples, illustrative of the present invention, employs a conentional brew house with a mash tub and a cereal cooker or boiler vessel. The mash tub and cereal cooker are tied to one another via a valved conduit, and a pump. The basic procedure was to suspend ground barley malt in water, heat the resulting suspension to a desired temperature, below that at which β-amylase is very active, and hold the resulting mash suspension at the desired temperature for a period of time. Concurrently, the cereal adjuncts, if desired, containing also a small amount of malt, are added to water and boiled for a period of time. Then mash is then mixed into the boiling liquid, with stirring.

WORT PREPARATION CYCLE

PREPARATION A 11,000 pounds of corn grits and 1,100 pounds of barley malt were added to 160 barrels of water, and the resulting mixture heated to boiling, with stirring, for thirty minutes in a cereal cooker.

Concurrently, 17,000 pounds of malt were added to 170 barrels of water, and heated to 52° C., with stirring, in a mash tub. The resulting malt mash was held at 52° C. for fifteen minutes, and the contents of the mash tub were then rapidly pumped over into the cereal boiler and stirred. The temperature of the resulting mixture at the completion of the addition of the malt mash was about 75° C.

PREPARATION B

To a cooking vessel is added 160 barrels of water which is brought to boiling.

Concurrently, 18,100 lbs. of malt were added to 170 barrels of water and heated to 50° C., with stirring, in a mash tub, and held at that temperature for 30 minutes. Then the contents of the mash tub were rapidly added to the cooking vessel, with agitation. The temperature of the resulting mixture was 75° C.

BREWING CYCLE

EXAMPLE I

The wort prepared in the WORT PREPARATION CYCLE, PREPARATION A, was filtered and the filtrate was boiled with 100 pounds of Cluster hops, strained and cooled to about 10° C. The resulting mixture was then transferred to a fermentation tank, pure oxygen was bubbled through the resulting mixture at a rate of 30 liters per minute, and wet Brewer's yeast was added at a rate of 0.45 gram (pressed yeast) per liter. The resulting mixture was allowed to ferment for 8 days at 12° to 16° C.

At the end of the fermentation, the resulting beer was passed to a stainless steel tank for aging under carbon dioxide. Primary aging was effected at 2° C. for 45 days, after which the beer was filtered, bottled and pasteurized in a conventional manner.

The bottled beer was stored in a refrigerator at 5° C. Tasting was made immediately after bottling and during storage. The mature beer was judged by a taste test panel to have a full malt beer flavor, without any harsh or grainy flavor. Calorie content of the beer was determined to be 99 calories per twelve ounces as determined by the American Society of Brewing Chemists method.

EXAMPLE II

The procedure of EXAMPLE I was repeated, substituting the wort prepared in the WORT PREPARATION CYCLE, PREPARATION B. Brewing, filtering, bottling, pasteurization, storage, etc., steps were all as in EXAMPLE I. The resulting beer was taste tested as in EXAMPLE I and judged to have a full malt beer flavor. Calorie content, determined as in EXAMPLE I was 99 calories per twelve ounces.

Certain changes may be made in the above processes without departing from the scope of the invention herein involved. It is therefore intended that all matter contained in the above description shall be interpreted as illustrative and not in a limiting sense.

We claim:

1. In a method for producing beer of reduced calorie content wherein a wort is prepared by blending warm malt mash with hot water under conditions which avoid exposing the blend of hot water and the malt mash to temperatures between about 52° C. and 75° C. and the resultant wort is converted to beer by fermenting the wort with Brewer's yeast, the improvement wherein said wort extract is oxygenated with substantially pure oxygen in place of air normally used in the fermentation, and said Brewer's yeast is added to the wort extract at a rate of about 30 to 60 grams pressed yeast per 100 liters wort so as to absorb, within the yeast cells of the Brewer's yeast, substantially all harsh and grainy flavor compounds contained in the wort extract.

2. In a method according to claim 1, the improvement wherein said Brewer's yeast is added at a rate of about 45 grams presses yeast per 100 liters wort.

3. In a method according to claim 1, the improvement wherein said fermentation is continued for 5 to 10 days at 10° to 16° C.

4. In a method according to claim 3, the improvement wherein said fermentation is continued for 8 days at 12° to 16° C.

5. In a method according to claim 1, wherein said yeast comprises *Saccharomyces cerevisiae*.

6. In a method according to claim 1, wherein said yeast comprises *Saccharomyces carlsbergensis*.

* * * * *

UNITED STATES PATENT AND TRADEMARK OFFICE
CERTIFICATE OF CORRECTION

PATENT NO. : 4,837,034

DATED : June 6, 1989

INVENTOR(S) : Joseph L. OWADES & Charles James KOCH

It is certified that error appears in the above—identified patent and that said Letters Patent is hereby corrected as shown below:

Claim 2, line 3 the word "presses" should be --pressed--.

Signed and Sealed this

Third Day of April, 1990

Attest:

HARRY F. MANBECK, JR.

Attesting Officer

Commissioner of Patents and Trademarks